United States Patent [19]

Koga et al.

[11] Patent Number: 4,971,128
[45] Date of Patent: Nov. 20, 1990

[54] AUTOMATIC RIM EXCHANGER FOR USE IN A TIRE UNIFORMITY MACHINE

[75] Inventors: Yukihiro Koga; Naoyuki Miyazono, both of Nagasaki, Japan

[73] Assignee: Mitsubishi Jukogyo Kabushiki Kaisha, Tokyo, Japan

[21] Appl. No.: 299,685

[22] Filed: Jan. 23, 1989

[30] Foreign Application Priority Data

Jan. 29, 1988 [JP] Japan .................................. 63-17169

[51] Int. Cl.$^5$ ...................... B60C 25/00; G01M 17/02
[52] U.S. Cl. ......................................... 157/21; 73/146
[58] Field of Search ....................... 157/14, 16, 20, 21; 73/146

[56] References Cited

U.S. PATENT DOCUMENTS 4,023,407 5/1977 Vanderzee .
4,380,927 4/1983 Oda et al. .
4,574,628 3/1986 Maikuma et al. ...................... 73/146

FOREIGN PATENT DOCUMENTS 2408164 8/1975 Fed. Rep. of Germany .

Primary Examiner—D. S. Meislin
Attorney, Agent, or Firm—Wenderoth, Lind & Ponack

[57] ABSTRACT

An improved automatic rim exchanger for use in a tire uniformity machine includes an upper spindle adapted to be rotated about the same axis as an axis of a tire, a fitting portion provided at the bottom of the upper spindle and associated with a chuck for detachably supporting upper rim structure of an upper rim holding member and upper rim, a lower spindle associated with a lock mechanism, which spindle is rotatably disposed on a lower spindle assembly mounted on an elevator member, has lower rim structure of a lower rim holding member and a lower rim detachably fitted therein, and is raised and lowered in the axial direction on the same axis, a jointly movable support member projecting from the lower rim means and adapted to be detachably fitted in a holding hole of the upper rim structure for supporting the upper rim structure, and a conveyor for supporting the vertically fitted upper and lower rim structure to feed and eject them.

2 Claims, 7 Drawing Sheets

AUTOMATIC RIM EXCHANGER FOR USE IN A TIRE UNIFORMITY MACHINE

BACKGROUND OF THE INVENTION

1. Field of the Invention:

The present invention relates to an automatic rim exchanger for use in a tire uniformity machine, which exchanger is adapted to dismount and mount upper and lower rim structures to exchange upper and lower rims for new rims corresponding to the size of a tire to be handled.

2. Description of the Prior Art:

At first, the above-referred tire uniformity machine in the prior art will be described in general with reference to FIGS. 4 and 5. As shown in these figures, an upper spindle 6 and a lower spindle 6' are disposed perpendicular to a roller conveyor 2 provided on a main frame 1 as conveying means for a tire T, and are arranged on the same axis as the axis of the tire T, and the upper spindle 6 is arranged so as to be rotatable by means of a rotary driving device 5 and holds an upper rim 9 at is bottom end.

The lower spindle 6' is supported by an elevator member (piston rod) 8a in an elevator device 8 such as a hydraulic cylinder or the like and holds a lower rim 10 at its top end, and the tire T is mounted between the upper and lower rims 9 and 10. In this state, the upper and lower spindles 6 and 6' are integrally rotatable, and by installing a loading device 3 and a load detecting device 4, a uniformity inspection the tire is carried out in a well-known manner.

Details of the heretofore known structures of the upper and lower spindles 6 and 6' and the upper and lower rims 9 and 10 are shown in FIG. 5. As shown in this figure, the upper rim 9 is fastened by means of bolts 12 to a mounting flange 11 provided at the bottom of the upper spindle 6, while the lower rim 10 is fastened by means of bolts 14 to a mounting flange 13 provided at the top of the lower spindle 6'. In addition, within the upper spindle 6 is formed an air feed passageway 16 for feeding pressurized air into the tire T through a rotary union 15. The lower spindle 6' is rotatably supported within a lower spindle main body 17 by means of a bearing 18. The elevator member 8a of the elevator device 8 is fastened by means of bolts to the spindle main body 17 so that the lower spindle 6' can be freely rotated and elevated or lowered. And in the mounting flange 11 at the bottom of the upper spindle 6 and on the top end of the lower spindle 6' are provided tapered cone-shaped fitting portions 19 and 20, which are engageable with and disengageable from each other in response to vertical movements of the upper and lower spindles 6 and 6'.

In addition, in the aforementioned tire uniformity machine, tire sizes and rim sizes are correlated to each other. Hence, in accordance with a change of tire sizes, exchange operations the upper and lower rims 9 and 10 on the upper and lower spindles 6 and 6' are necessitated. However, the above-described exchange operation includes mounting and dismounting the upper and lower rims 9 and 10 to and from the upper and lower spindles 6 and 6' via bolts 12 and 14, and such necessitates an extremely long time associated with maintaining mounting precisions of the upper and lower rims 9 and 10, and also necessitates skilled manpower. Furthermore, as the rim itself is a considerably heavy body and the working space is relatively narrow, the aforementioned rim exchange work that is executed entirely by hand must occur under a severe working condition.

Automatic rim exchangers for dealing with the aforementioned problems have been already developed and proposed (Laid-Open Japanese Patent Specification No. 60-49930 (1985); Laid-Open Japanese Patent Specification No. 60-76330 (1985)), and these automatic rim exchangers have the structure shown in FIGS. 6 and 7. Instead of the mounting/dismounting structure which detachably mounts the upper and lower rims 9 and 10 to the upper and lower spindles 6 and 6' by bolt fastening means, the upper rim 9 is capable of being automatically mounted and dismounted by providing a lock device 26 or 26a which can be engaged with and disengaged from the upper spindle 6. The lower rim 10 is integrally assembled with the lower spindle 6', but the lower spindle 6' is detachably mounted to the elevator member (piston rod) 8a, thereby allowing the lower rim 10 to be detached. Thus, the upper and lower rims 9 and 10 can be dismounted and mounted to be exchanged. In either one of these known rim exchangers, it is necessary to prepare a plurality of spindle assemblies 50 or 50a that is highly precise and expensive for one tire uniformity machine as shown in FIG. 6. Since the spindle assembly is a considerably heavy body, an exchange unit 60 including that assembly has such a heavy weight that its exchange by humanpower is impossible. And since the tire uniformity machine allows a limited working space, it is necessary to make the exchange unit as light as possible. With regard to further detailed explanation of the structures shown in FIGS. 6 and 7, reference should be made to the above-cited laid-open Japanese patent specifications.

As will be seen from the above description, the automatic rim exchangers for use in a tire uniformity machine in the prior art involve problems in that they necessitated a plurality of spindle assemblies that are highly precise and expensive for exchanging rims, resulting in a very high cost, and in that a plurality of exchange units including the aforementioned spindle assemblies are considerably heavy bodies, and bring about difficulties in the rim mounting/dismounting work within the limited working space of the tire uniformity machine.

SUMMARY OF THE INVENTION

The present invention has been developed to overcome the aforementioned problems in the prior art, and it is one object of the present invention to provide an automatic rim exchanger for use in a tire uniformity machine, in which the mechanical structure is greatly simplified, the cost associated therewith is reduced, and mounting/dismounting and exchange operations for upper and lower rim means are improved.

According to one feature of the present invention, there is provided an automatic rim exchanger for use in a tire uniformity machine, comprising an upper spindle adapted to be rotated about the same axis as an axis of a tire, a fitting portion provided at the bottom of the upper spindle and associated with chuck means for detachably supporting upper rim means consisting of an upper rim holding member and an upper rim, a lower spindle associated with lock means, which spindle is rotatably disposed on a lower spindle assembly mounted on an elevator member, has lower rim means consisting of a lower rim holding member and a lower rim detachably filtered therein, and is raised and lowered in the axial direction on the aforementioned same axis, a jointly movable support member projecting from the aforementioned lower rim means and adapted to be detachably fitted in a holding hole of the aforementioned upper rim means for supporting the upper rim means, and conveyor means for supporting the upper and lower rim means to feed or eject them.

According to the present invention, owing to the disposition of the lower spindle on the lower spindle assembly mounted to the elevator member and the association thereof with the lock means, automatic mounting and dismounting operations of various sizes of lower rim means to the lower spindle is made possible. Also, owing to the support of the upper and lower rim means by the jointly movable support member and the holding hole, and owing to the fitting portion associated with chuck means of the upper spindle, automatic mounting and dismounting operations of various sizes of upper rim means to the upper spindle is made possible, unit feed and ejection of only the lower rim means by the conveyor means is made possible, and in addition to the simplification of a mechanism and the reduction in the cost associated therewith, the operability and efficiency of the mounting, dismounting and exchange of the upper and lower rims are improved.

In operation, the upper and lower rim means, in which the jointly movable support member projecting from the lower rim means is fitted in the holding hole in the upper rim means to support the latter, is carried between the upper and lower spindles by unit conveyor means. Then, by raising the lower spindle in the axial direction by the elevator member via the lower spindle assembly, the lower rim means is locked to and fitted in the lower spindle by the lock means. Thus, both the upper and lower rim means are raised, the upper rim means is chucked and fitted in the fitting portion associated with chuck means at the bottom of the upper spindle, and the upper and lower rim means fitted to the upper and lower spindles are separated by the lower spindle assembly and the lower spindle which are moved by the elevator member. Thus, the automatic rim mounting is completed, and tire uniformity inspection becomes possible.

Also, in the reverse process consisting of the steps of fixing the upper rim means with the jointly movable support member and the holding hole by raising the lower spindle assembly, the lower spindle and the lower rim means by means of the elevator member, of releasing the chucking of the upper rim means by the chuck means, of lowering the lower spindle assembly, the lower spindle and the upper and lower rim means, of supporting the upper and lower rim means by the conveyor means, of unlocking the lower rim means by the lock means, of lowering and disengaging the lower spindle assembly and the lower spindle, and of carrying out of the upper and lower rim means with the conveyor means, automatic removal of rims by carrying out only the upper and lower rim means is effected. Hence, mounting/dismounting and exchange of the upper and lower rim means, that is, of the upper and lower rims can be achieved efficiently and smoothly.

The above-mentioned and other objects, features and advantages of the present invention will become more apparent by referring to the following description of one preferred embodiment of the invention in conjunction with the accompanying drawings.

DETAILED DESCRIPTION OF THE PREFERRED EMBODIMENT

Figure 1:
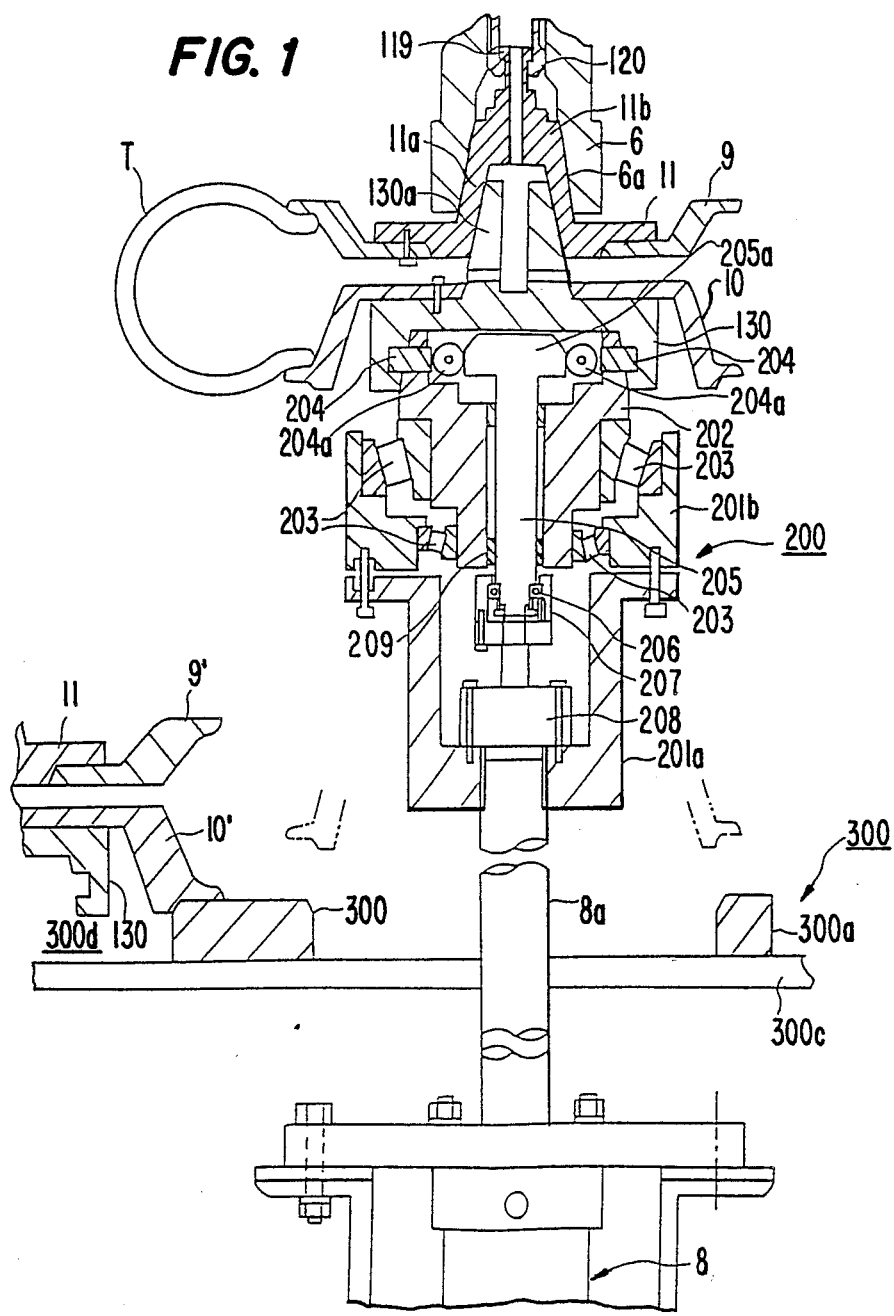
FIG. 1 is a longitudinal cross-sectional view of an essential part of one preferred embodiment according to the present invention.
Figure 2:
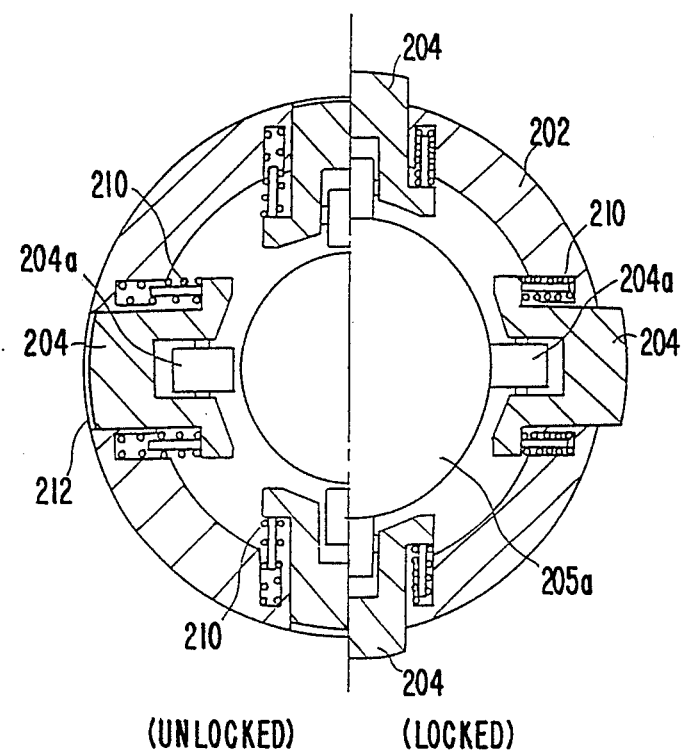
FIG. 2 is a transverse cross-sectional view of part of lock means in the embodiment of FIG. 1.
Figure 3:
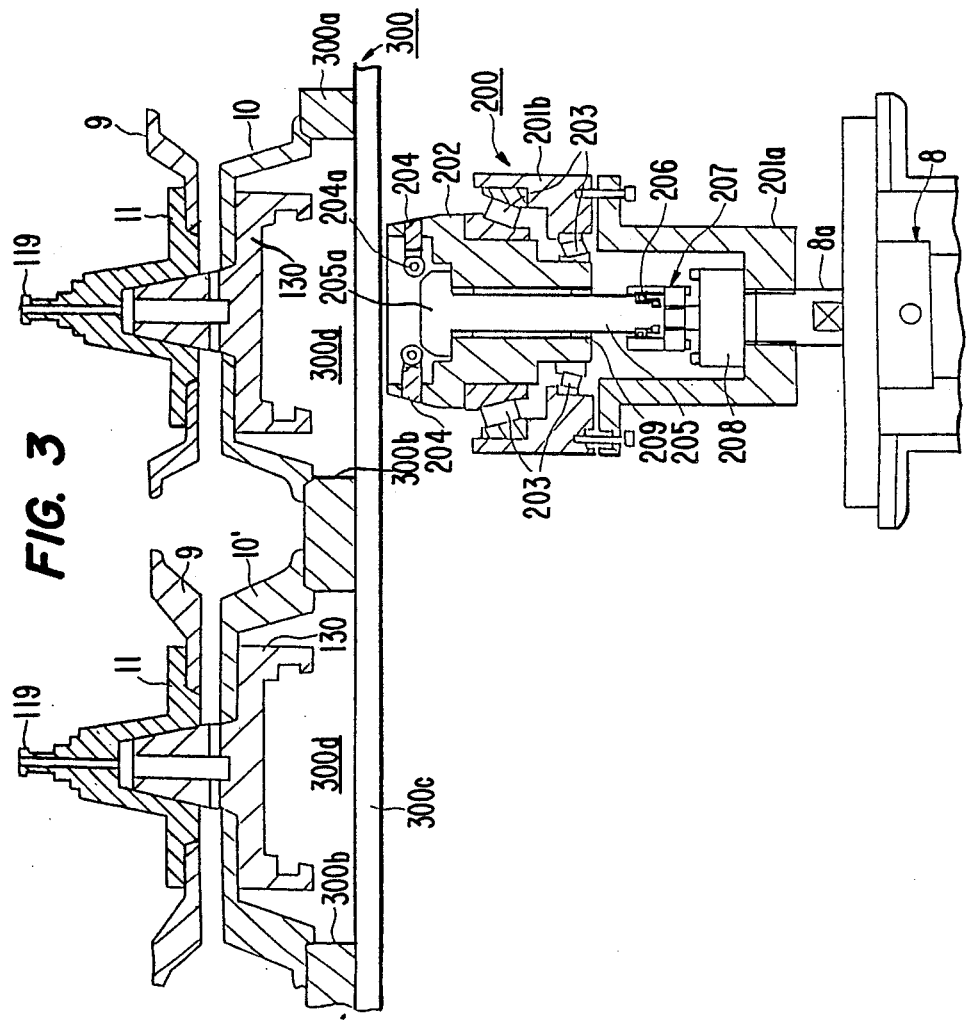
FIG. 3 is a longitudinal cross-sectional view of an essential part of the embodiment of FIG. 1 showing the state of feeding and ejecting upper and lower rim means by conveyor means.
Figure 4:
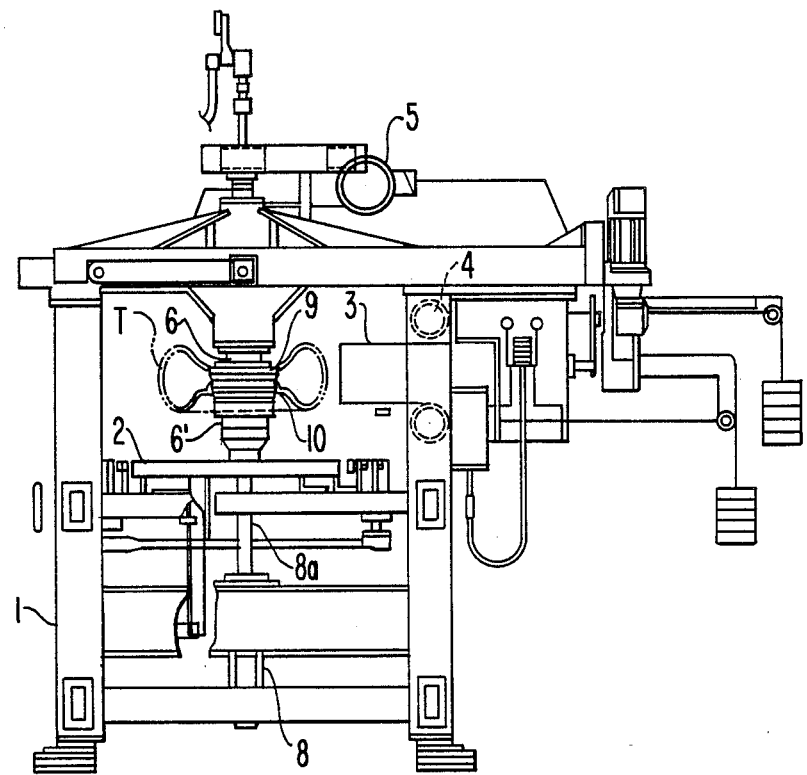
FIG. 4 is an overall front view of a tire uniformity machine in the prior art.
Figure 5:
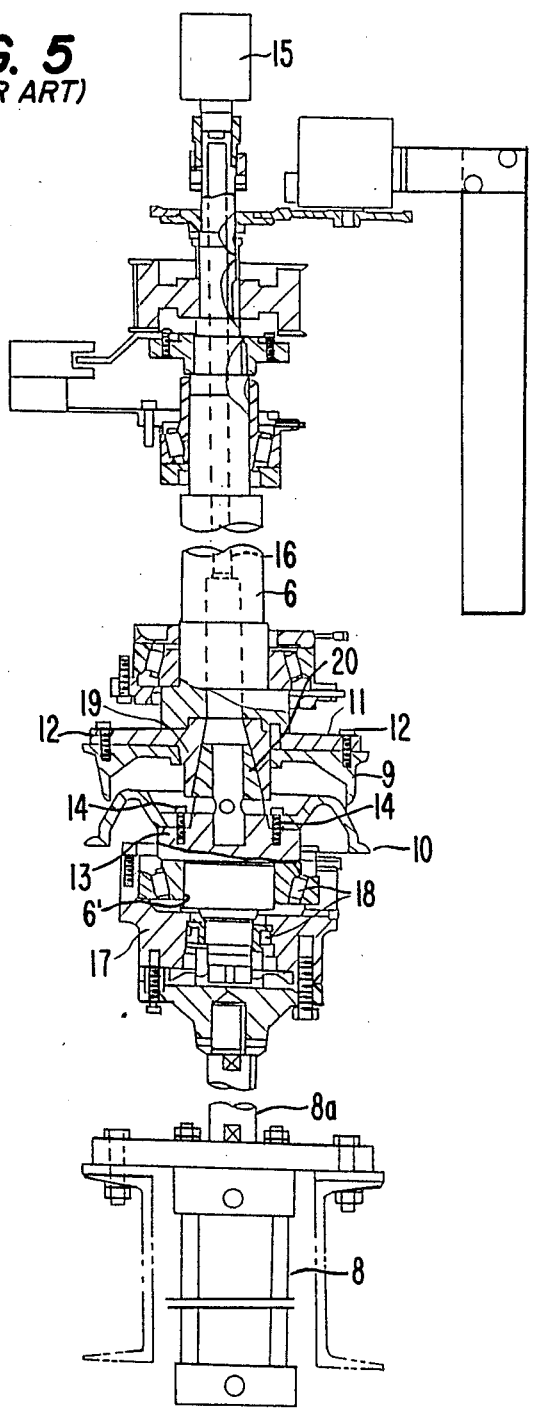
FIG. 5 is a longitudinal cross-sectional view of one example of an upper and lower rim mounting system in the prior art.
Figure 6:
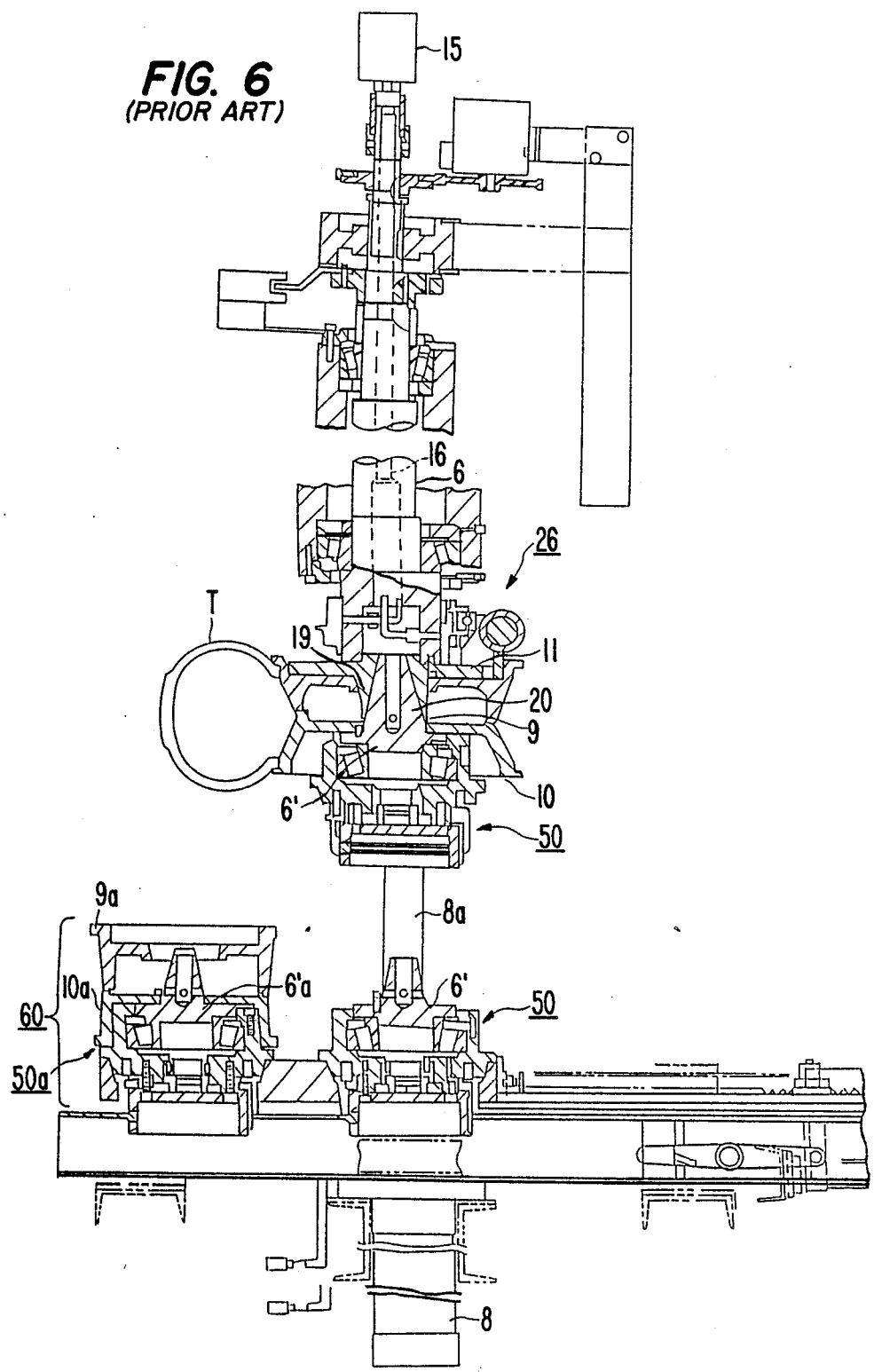
FIG. 6 is a longitudinal cross-sectional view of one example of an automatic rim exchanger in the prior art.
Figure 7:
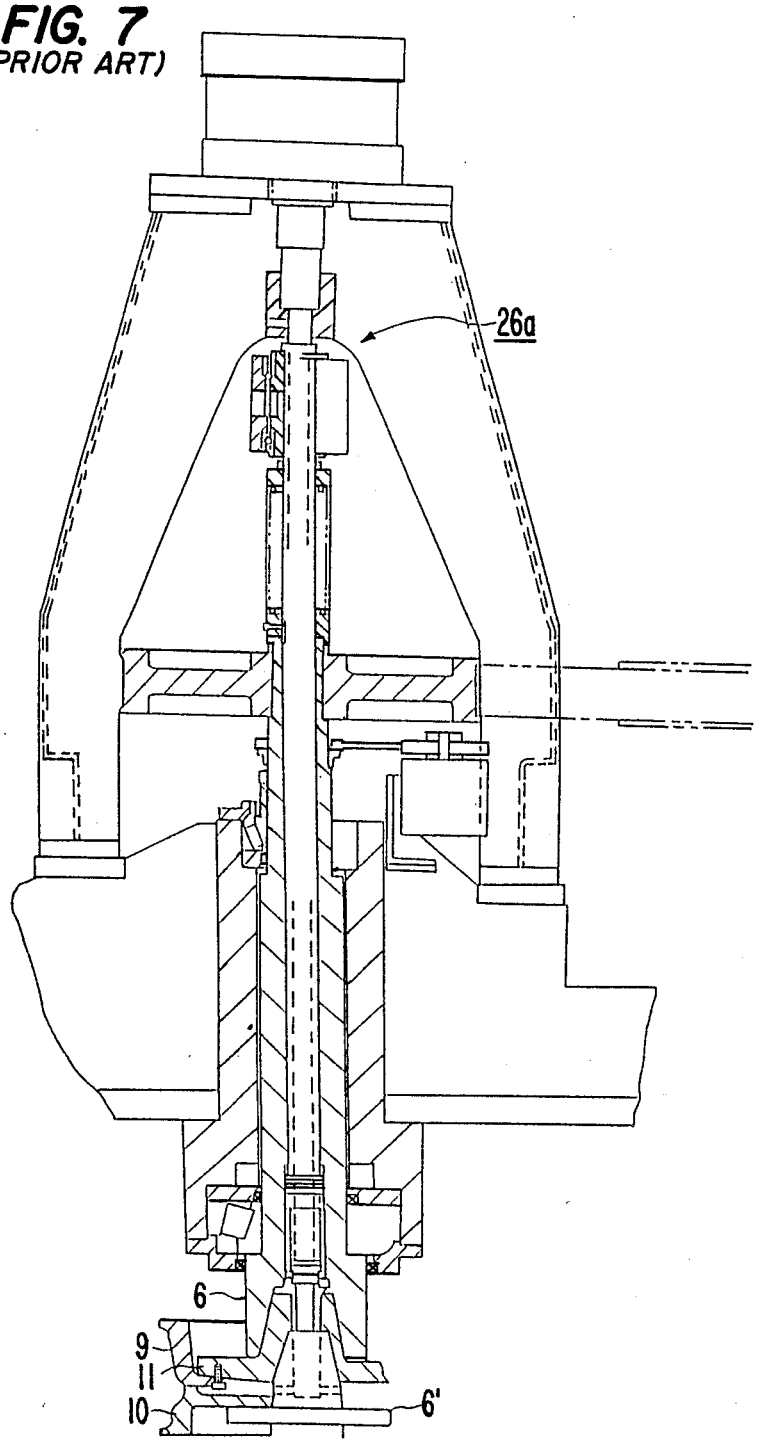
FIG. 7 is a longitudinal cross-sectional view of another example of the same in the prior art.

One preferred embodiment of the present invention is illustrated in FIGS. 1 to 3. In these figures, reference numeral 6 designates an upper spindle disposed coaxially with an axis of a tire T and adapted to be rotated, reference numeral 8 designates an elevator device, numeral 8a designates an elevator member (piston rod) that is raised or lowered in the axial direction along the abovementioned axis by the elevator device 8, numeral 9 designates an upper rim detachably mounted to an upper rim holding member 11 by means of bolts or the like that is replaceable by similar rims of various sizes, numerals 119, 120 designate chuck means disposed within a fitting portion 6a in the lower section of the upper spindle 6, numeral 200 designates a lower spindle assembly mounted on the elevator member 8a and having a lower spindle 202 rotatably disposed therein, and numerals 204, 205, ... designate lock means disposed in the upper portion of the lower spindle 202. The illustrated automatic rim exchanger for use in a tire uniformity machine comprises the upper spindle 6 adapted to be rotated about the same axis as an axis of a tire T, a fitting portion 6a provided at the bottom of the upper spindle 6 and associated with the chuck means 119, 120 for detachably supporting upper rim structure 9, 11 consisting of the upper rim holding member 11 and the upper rim 9, the lower spindle 202 associated with the lock means 204, 205, ... , which spindle is rotatably disposed on a lower spindle assembly 200 mounted on the elevator member 8a, has lower rim structure 10, 130 consisting of a lower rim holding member 130 and a lower rim 10 detachably fitted therein, and is raised and lowered in the axial direction on the same axis, a jointly movable support member 130a projecting from the lower rim structure 10, 130 and adapted to be detachably fitted in a holding hole 11a of the upper rim structure 9, 11 for supporting the upper rim structure; and conveyor means 300 for supporting the vertically fitted upper and lower rim structures 9, 11 and 10, 130 to feed or eject them to and from a rim exchange station.

As shown in FIG. 1, the above-described chuck means 119, 120 consists of a collet chuck 120 disposed within the fitting portion 6a provided at the bottom of the upper spindle 6 and actuated to be expanded or contracted by an elevator driving device (not shown), and a collet nipple portion 119 provided so as to further project from the projected portion 11b formed on the upper rim holding member 11 to be fitted in the fitting portion 6a, as a result of rising/falling and expanding-/contracting operations of the collet chuck 120, the collet nipple portion 119 is chucked and held or unchucked and released, and thus it is possible to fit and fix the upper rim holding member of the upper rim structure 9, 11 in the fitting portion 6a of the upper spindle 6 or to disengage them from each other.

The above-described lower spindle assembly 200 includes a connecting member 201a fixedly secured to the top of the elevator member 8a, and a spindle main body 201b connected onto the connecting member 201a by means of bolts. The lower spindle 202 projects into the spindle main body 201b and is rotatably supported via a plurality of bearings 203.

As shown in FIGS. 1 and 2, the above-described lock means 204, 205, . . . comprises a plurality of lock plates 204 extending in through-holes 212 formed in the upper portion of the lower spindle 202 so as to be capable of advancing and retreating (in the radial directions) and spaced from one another in the circumferential direction, springs 210 resiliently biasing the lock plates 204 in the retreating directions, rollers 204a disposed at the inner ends of the respective lock plate is 204, and an elevator cam rod 205 having a drive head 205a butting against the respective rollers 204a. The elevator cam rod 205 is fitted via a bearing 206 in a bearing box 207 that is raised or lowered by an elevator cylinder 208 disposed at the inner bottom portion of the connecting member 201a, so that the elevator cam rod 205 is raised or lowered by the elevator cylinder 208 via the bearing box 207. As a result of the rise and fall of the drive head 205a of the elevator cam rod 205, the respective lock plates 204 are projected or retracted from the circumferential surface of the lower spindle 202 via the rollers 204a. Thus the lower rim holding member 130 fitted to the top of the lower spindle 202 is either locked or unlocked. In FIG. 1, reference numeral 209 designates a bush.

The above-described conveyor means 300 consists of a truck 300a equipped with a plurality of holders 300b for simultaneously supporting a unit of upper and lower rim structures 10, 130 and 9, 11 by supporting the circumferential portion of the lower rim 10 as shown in FIGS. 1 and 3, and traveling rails 300c for supporting the truck 300a so that it can travel in the direction of an arrow shown in FIG. 3. At the central portion of the holder 300b is formed a holder hole 300d which allows the lower spindle assembly 200 to rise or fall therethrough. On the respective holders 300b are disposed various sizes of upper and lower rim structure 10,130, 9,11 and 10',130, 9',11, and by being conveyed in the direction of the arrow, the above-mentioned rim means of upper and lower rim structures are fed to a rim exchange station between the upper and lower spindles 6 and 202 or are carried out from there.

Now the operation of the preferred embodiment of the present invention having the above structure will be described. As shown in FIG. 3, the lower spindle 202 is lowered jointly with the lower spindle assembly 200 to a first position below the conveyor means 300 by the elevator member 8a of the elevator device 8. By traveling in the direction of the arrow (FIG. 3) of the conveyor means 300, the rim means of upper and lower rim structures 9, 10, 10, 130 having a desired size and supported on the holder 300b is brought to the rim exchange station between the upper and lower spindles 6 and 202. When the lower spindle 202 has been raised jointly with the lower spindle assembly 200 by the elevator member 8a now at a second position, the top portion of the lower spindle 202 fits into the lower portion of the lower rim holding member 130. As a result of the raising of the drive head 205a of the elevator cam rod 205 caused by the elevator cylinder 208, the respective lock plates 204 are projected outwards via the rollers 204a. Hence, the lower rim structure 10, 130, is fitted and locked to the top portion of the lower spindle 202 by the above-described lock means, and further it is raised jointly with the upper rim structure 9, 11 by moving the elevator member to a third position (FIG. 1).

As the above-mentioned rising motion proceeds, the projected portion 11b of the upper rim structure 9, 11 fits in the fitting portion 6a of the upper spindle 6, the collet nipple portion 119 is chucked by the collet chuck 120 of the chuck means 119, 120, and thus the upper rim structure 9, 11 is fixedly fitted in the lower portion of the upper spindle 6.

When the elevator member 8a is switched to lower, the lower spindle assembly 200, the lower spindle 202 and the lower rim structure 10, 130 are lowered, and the upper and lower rim structures 9, 11 and 10, 130 fixedly mounted to the upper and lower spindles 6 and 202, respectively, are separated from each other. Thus, automatic rim mounting has been completed, and it becomes possible to perform tire uniformity inspection.

Upon the exchanging of the upper and lower rims in accordance with the tire size, the lower spindle assembly 200, the lower spindle 202 and the lower rim structure 10, 130 are raised by the elevator member 8a. The rising motion is stopped when the jointly movable support member 130a of the lower rim structure 10, 130 is fitted in the holding hole 11a of the upper rim structure 9, 11. And, by unchucking the chuck means 119, 120, the upper rim structure 9, 11 is released.

When the elevator member 8a is switched to lower, the lower spindle assembly 200, the lower spindle 202 and the upper and lower rim structure 9, 11 and 10, 130 are lowered, and the upper and lower rim structures are received and supported as one unit (rim means) on the holder 300b of the conveyor means 300 disposed at the below. After unlocking the lock means 204, 205, . . . the lower spindle assembly 200 and the lower spindle 202 are further lowered, the lower spindle 202 is separated downwards, and only the upper and lower rim structures 9, 10 and 10, 130 are supported and carried out by the conveyor means 300.

Another unit of the upper and lower rim structures 9', 11 and 10', 130 having a new size corresponding to a tire size, is carried to the rim exchange station between the upper and lower spindles 6 and 200 by the conveyor means 300. Then the upper and lower rim structures 9', 11 and 10', 130 are mounted to the upper and lower spindles 6 and 202, respectively, by the above-described automatic rim exchanger, and thus an automatic rim exchange has been carried out.

As will be seen from the detailed description above, according to the present invention, owing to the fact that the lower spindle is disposed in a rotatable and vertically movable manner on the lower spindle assembly mounted to the elevator member and lock means is provided, automatic mounting and dismounting operations of various sizes of lower rim structure to and from the lower spindle is made possible. Also, owing to a fitting support of the upper rim structure into the holding hole by means of the jointly movable support member projected from the lower rim structure and the fitting portion associated with the chuck means of the upper spindle, automatic mounting and dismounting operations of various sizes of upper rim structure to and from the upper spindle is made possible. And owing to the feed and ejection of the unit of the upper and lower rim structure only by means of the conveyor means, in addition to the great simplification of the mechanism and reduction in cost associated therewith, the operativity and efficiency of the mounting, dismounting and exchange of the upper and lower rims are remarkably improved.

While the present invention has been described above in connection to one preferred embodiment of the invention, it is a matter of course that the present invention should not be limited to only the illustrated embodiment, but various changes and modifications in design could be made without departing from the spirit of the invention.

What is claimed is:

1. An automatic rim exchanger for use in a tire uniformity machine, comprising:
    a plurality of rim means for supporting tires of different sizes, each said rim means including upper rim structure consisting of an upper rim holding member, and an upper rim fixed to said upper rim holding member and defining therewith a holding hole, and lower rim structure consisting of a lower rim holding member, a lower rim fixed to said lower rim holding member, and a support member projecting into said holding hole so as to support said upper rim structure;
    conveyor means for supporting said rim means and for selectively conveying said plurality of rim means to and from a rim exchange station defined in the exchanger;
    a rotatable upper spindle supported in the exchanger above the rim exchange station, said upper spindle defining a fitting portion at the bottom thereof engageable with the upper rim structure of each of said rim means,
    a lower spindle assembly disposed below said upper spindle;
    a lower spindle disposed on and rotatably supported by said lower spindle assembly coaxial to said upper spindle;
    an elevator member to which said lower spindle assembly is mounted,
    means for moving said elevator member between a first position at which said lower spindle assembly and the lower spindle disposed thereon are located below the rim exchange station, a second position at which said lower spindle assembly and the lower spindle disposed thereon are located at the rim exchange station, and a third position at which said lower spindle assembly and the lower spindle disposed thereon confront said upper spindle;
    locking means operatively associated with said elevator member and cooperating with said lower spindle for automatically locking said lower spindle to the lower rim structure of a said rim means supported by said conveyor means at the rim exchange station as said elevator member is moved from said first position thereof to said third position thereof, and for automatically unlocking such lower rim structure from said lower spindle as said elevator member is moved from said third position to said second position; and
    chucking means for chucking the upper rim structure of a said rim means to said upper spindle when said elevator member is at said third position with said lower spindle locked to the lower rim structure of the rim means and the upper rim structure of the rim means engaging the fitting portion of said upper spindle.

2. An automatic rim exchanger for use in a tire uniformity machine, comprising:
    a plurality of rim means for supporting tires of different sizes, each of said rim means comprising an upper rim structure and a lower rim structure supporting said upper rim structure;
    conveyor means for supporting said rim means and for selectively conveying said plurality of rim means to and from a rim exchange station defined in the exchanger;
    a rotatable upper spindle supported in the exchanger above the rim exchange station, said upper spindle being engageable with the upper rim structure of each of said rim means;
    a lower spindle assembly disposed below said upper spindle;
    a lower spindle disposed on and rotatably supported by said lower spindle assembly coaxial to said upper spindle;
    an elevator member to which said lower spindle assembly is mounted,
    means for moving said elevator member between a first position at which said lower spindle assembly and the lower spindle disposed thereon are located below the rim exchange station, a second position at which said lower spindle assembly and the lower spindle disposed thereon are located at the rim exchange station, and a third position at which said lower spindle assembly and the lower spindle disposed thereon confront said upper spindle;
    locking means operatively associated with said elevator member and cooperating with said lower spindle for automatically locking said lower spindle to the lower rim structure of a said rim means supported by said conveyor means at the rim exchange station as said elevator member is moved from said first position thereof to said third position thereof, and for automatically unlocking such lower rim structure from said lower spindle as said elevator member is moved from said third position to said second position; and
    chucking means for chucking the upper rim structure of a said rim means when said elevator member is at said third position with the lower rim structure of the rim means locked to said lower spindle and the upper rim structure of said rim means engaged with said upper spindle.

* * * * *